(12) United States Patent
Paget et al.

(10) Patent No.: US 9,729,973 B2
(45) Date of Patent: Aug. 8, 2017

(54) WIRELESS POWER TRANSMISSION

(71) Applicant: AIRBUS OPERATIONS LIMITED, Bristol (GB)

(72) Inventors: Christophe Paget, Bristol (GB); Thomas Sainthuile, Bristol (GB); Christophe Delebarre, Bristol (GB); Sébastien Grondel, Bristol (GB)

(73) Assignee: Airbus Operations Limited, Bristol (GB)

( * ) Notice: Subject to any disclaimer, the term of this patent is extended or adjusted under 35 U.S.C. 154(b) by 349 days.

(21) Appl. No.: 13/771,684

(22) Filed: Feb. 20, 2013

(65) Prior Publication Data
US 2013/0236038 A1    Sep. 12, 2013

(30) Foreign Application Priority Data
Feb. 20, 2012 (GB) .................................. 1202880.9

(51) Int. Cl.
| | | |
|---|---|---|
| *H04R 17/00* | (2006.01) | |
| *H02N 2/18* | (2006.01) | |
| *G01M 5/00* | (2006.01) | |

(52) U.S. Cl.
CPC .......... *H04R 17/00* (2013.01); *G01M 5/0066* (2013.01); *H02N 2/181* (2013.01)

(58) Field of Classification Search
CPC ................................ H04R 17/00; H02N 2/181
USPC ......................................................... 367/155
See application file for complete search history.

(56) References Cited

U.S. PATENT DOCUMENTS

| | | | | |
|---|---|---|---|---|
| 5,767,407 | A * | 6/1998 | Sinha .................. | G01N 29/036 702/54 |
| 6,236,276 | B1 * | 5/2001 | Cewers ................ | B06B 1/0253 324/652 |
| 7,276,703 | B2 * | 10/2007 | Berkcan et al. ........... | 250/358.1 |
| 8,362,745 | B2 * | 1/2013 | Tinaphong ................. | 320/108 |
| 2007/0114422 | A1 | 5/2007 | Berkcan et al. | |
| 2010/0102673 | A1 | 4/2010 | Leukkunen | |
| 2011/0140579 | A1 | 6/2011 | Moon et al. | |
| 2011/0175461 | A1 | 7/2011 | Tinaphong | |
| 2011/0299470 | A1 * | 12/2011 | Muller et al. ................. | 370/328 |
| 2012/0007468 | A1 | 1/2012 | White et al. | |

FOREIGN PATENT DOCUMENTS

| | | |
|---|---|---|
| CN | 1822905 | 8/2006 |
| CN | 102157988 | 8/2011 |
| WO | WO 2006/046937 | 5/2006 |

OTHER PUBLICATIONS

Grondel, et al.,"Design of optimal configuration for generating A0 lamb in a composite plate using piezoceramic transducer" Journal of Acoustic Society of america, Jul. 2002; (112(1):84-90.*
Sainthuile, et al.,"Vibration power harvesting for wireless PZT-based SHM application," proceeding of the 5th EPROCEEDINGs of the 5th European workshop, Dec. 31, 2010, pp. 679-684.*

(Continued)

*Primary Examiner* — Thienvu Tran
*Assistant Examiner* — Pinping Sun
(74) *Attorney, Agent, or Firm* — Nixon & Vanderhye P.C.

(57) ABSTRACT

A method, apparatus and software are disclosed for wireless power transmission in which the power transmission frequency is optimised.

36 Claims, 5 Drawing Sheets

(56) References Cited

OTHER PUBLICATIONS

Roudy, et al.,"Improving power output for vibration-based Energy scavengers," Pervasive computing, IEEE, vol. 4, issue 1, Mar. 7, 2005, p. 28-36.*
Sari,"An electromagnetic micro power generator for wideband environmental vibration," Nov. 26, 2007, sensor and actuator,pp. 405-413.*
Ferrari, "Piezoelectric multifrequency energy converter for power harvesting in automomous microsystems," Mar. 10, 2008, sensors and actuator, vol. 142, issue 1, pp. 329-335.*
Extended European Search Report dated Aug. 20, 2014 in EP 13156048.4, 7 pages.
T. Sainthuile et al, "Vibrational power harvesting for wireless PZT-based SHM applications" Proceedings of the $5^{th}$ European Workshop—Structural Health Monitoring, Dec. 2010, 8 pages.
Search Report for GB 1202880.9 dated Jun. 12, 2012.
Office Action cited in CN Application No. 201310054883.X, mailed Jan. 29, 2016, 29 pages.

\* cited by examiner

US 9,729,973 B2

WIRELESS POWER TRANSMISSION

This application claims priority to GB 1202880.9 filed 20 Feb. 2012, the entire contents of which is hereby incorporated by reference.

FIELD OF INVENTION

The present invention relates to a method, apparatus and software for wireless power transmission.

BACKGROUND OF THE INVENTION

Power harvesting devices are used to generate power from energy embodied in a structure with which the device is associated. Thermal, solar, wind, chemical or kinetic energy may be harvested for generating power. Kinetic energy may be in the form of structural vibrations. Power harvesting devices are commonly used in wireless sensor networks.

The efficiency of power generation from kinetic energy in the form of structural vibrations is dependent on the correlation between the resonant frequency of the harvesting device sensor element and the resonant frequencies of the structural vibrations. The closer the resonant frequency of the harvesting sensor is to that of a significant frequency of the vibrations, the greater the power that can be harvested.

One problem with harvesting energy from structural vibrations is that the frequencies of the vibrations in a given structure commonly vary depending on the operational loads or conditions to which the structure is subjected. Furthermore, in some operational states, the amplitude of any vibrations in a structure may be so low that little power can be harvested from them.

SUMMARY OF THE INVENTION

An embodiment of the invention provides a method for wireless power transmission between one or more piezoelectric power harvesting devices attached to a structure a piezoelectric generator attached to the structure, the generator being arranged to generate vibrations in the structure, the method comprising the steps of:

determining the harvested voltage for the or each power harvesting device in response to a plurality of test generation frequencies for the generator;
selecting a generation frequency from one of the test frequencies based on the harvested voltages in accordance with a predetermined formula; and
driving the generator to generate vibrations in the structure at the generation frequency.

The vibrations may be Lamb waves. The vibrations may comprise one or more non-dispersive Lamb wave modes. The predetermined formula may comprise selecting the generation frequency as the test frequency producing the highest cumulative voltage from all the power harvesting devices. The predetermined formula may comprise selecting the generation frequency as the test frequency producing the highest voltage from any one of the power harvesting devices. The predetermined formula may comprise selecting the generation frequency as the test frequency producing the greatest proportion of voltages from all power harvesting device exceeding a predetermined threshold.

The method may be performed in response to a predetermined set of changes of state associated with the structure. The structure may be an aircraft and the set of changes of state comprises one or more operational states of the aircraft. The determining of the harvested voltage and the selecting of the generation frequency may be repeated at a higher test frequency resolution for a predetermined frequency band comprising the first selected generation frequency. The power harvesting devices may be arranged to harvest power from the generation frequency and from ambient vibration in the structure.

The generator and the power harvesting devices may comprise wireless communications means for communicating data representing the harvested voltage to the generator. The data representing the harvested voltage may be provided by a given power harvesting device to the generator in response to a request to the power harvesting device from the generator. One or more of the power harvesting devices may be arranged to power sensors. The sensor and power harvesting device may use the same piezoelectric element for sensing and power harvesting respectively. The range of the test frequencies is 1 kHz to 2 MHz.

Another embodiment provides apparatus for wireless power transmission between one or more piezoelectric power harvesting devices attached to a structure a piezoelectric generator attached to the structure, the generator being arranged to generate vibrations in the structure, the apparatus being operable to:

determine the harvested voltage for the or each power harvesting device in response to a plurality of test generation frequencies for the generator;
select a generation frequency from one of the test frequencies based on the harvested voltages in accordance with a predetermined formula; and
drive the generator to generate vibrations in the structure at the generation frequency.

A further embodiment of the invention provides a computer program stored on a computer readable medium and loadable into the internal memory of a computer, comprising software code portions arranged, when the program is run on a computer, for performing a method for wireless power transmission between one or more piezoelectric power harvesting devices attached to a structure a piezoelectric generator attached to the structure, the generator being arranged to generate vibrations in the structure, the method comprising the steps of:

determining the harvested voltage for the or each power harvesting device in response to a plurality of test generation frequencies for the generator;
selecting a generation frequency from one of the test frequencies based on the harvested voltages in accordance with a predetermined formula; and
driving the generator to generate vibrations in the structure at the generation frequency.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
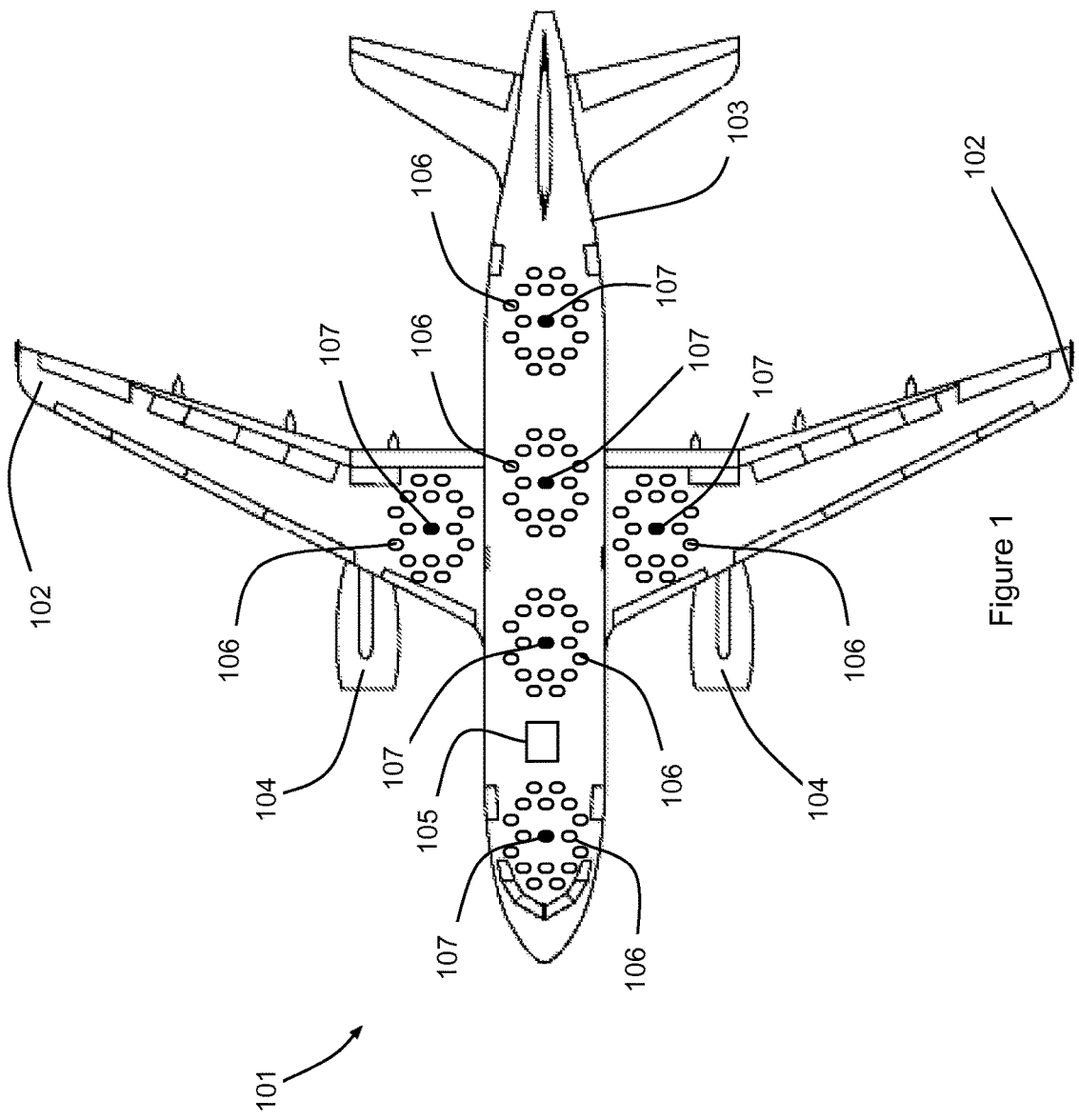
FIG. 1 is a schematic illustration of an aircraft comprising a structural health monitoring (SHM) system.

With reference to FIG. 1, an aircraft 101 comprises a pair of wings 102 faired into a fuselage 103. Each of the wings carries an engine 104. In the present embodiment, the aircraft 101 is provided with a structural health monitoring (SHM) system 105, which utilises a set of sensors 106 to collect SHM data representing acoustic emissions, in the form of guided Lamb waves, from the structure of the aircraft 101. The SHM data is used to monitor the integrity of the aircraft structure. In the present embodiment, the sensors 106 are arranged to communicate with the SHM system 105 wirelessly and each of the sensors 106 is autonomously powered via an integrated power-harvesting device. For clarity, only example sets of sensors 106 are shown in FIG. 1. In practice sensors 106 may be distributed throughout the aircraft 101.

In the present embodiment, a set of wireless power transmission (WPT) devices 107 are provided at selected points on the structure of the aircraft 101. Each WPT device 107 is powered by the aircraft systems and arranged to generate high frequency vibrations in the structure of the aircraft 101 at a predetermined frequency so as to transmit power in the form of kinetic energy through the structure of the aircraft 101. The vibrations enable the surrounding group of sensors 106 to receive the transmitted power via their respective integrated power harvesting devices. The harvested power is then used for the operation of the sensor 106 for collecting SHM data and communicating it wirelessly to the SHM system 105.

Figure 2:
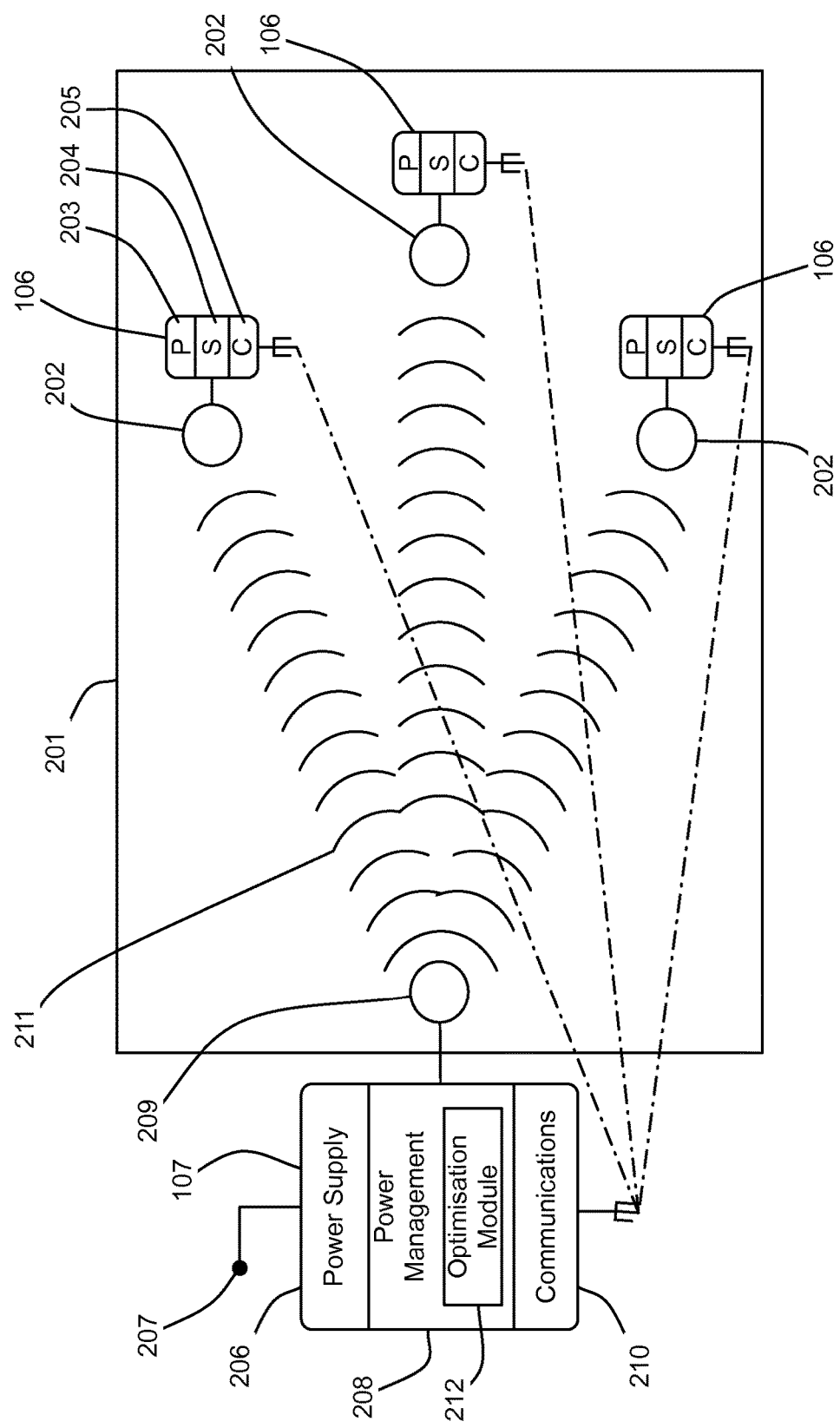
FIG. 2 is a schematic illustration of wireless power transmission system for transmitting power to a sensor in the SHM system of FIG. 1.

With reference to FIG. 2, each of the sensors 106 comprises a first piezoelectric element 202 attached to the aircraft structure 201 in the form of 3 mm thick aluminium plate. In the present embodiment, the first piezoelectric elements 202 are 2 mm thick, 20 mm diameter circular piezoceramic sensors of type Pz27 from Ferroperm Piezoceramics A/S, Hejreskovvej 18A DK-3490 Kvistgård, Denmark. The first piezoceramic sensors 202 are selected with modes of resonant vibration in both the thickness extension mode and the radius extension mode, in other words, the directions respectively perpendicular and parallel to the plane of the plate 201. Each first piezoelectric element 202 is connected to a power harvester module (P) 203 that comprises a model LTC 3588-1 piezoelectric energy harvesting power supply from Linear Technology Corporation, Milpitas, Calif., USA, in conjunction with ancillary circuitry as described further below with reference to FIG. 5. The power harvested from the first piezoelectric element 202 by the power harvester module (P) 203 is stored and used for powering sensor logic (S) 204 and a wireless communications to module (C) 205 of the sensor 106.

The WPT device 107 comprises a power supply 206 arranged to draw power from the aircraft systems 207, a power management module 208, a second piezoelectric element 209 and a wireless communications module 210. The power supply 206 is arranged to provide a selectable range of frequencies of signal to the second piezoelectric element 209 under the control of the power management module 208. In the present embodiment, the power supply is arranged to provide signals at 10 volts peak in the selectable frequency range 100 kHz to 600 kHz with a sinusoidal waveform. The second piezoelectric element 209 is also a 2 mm thick, 20 mm diameter circular piezoceramic sensors of type Pz27 from Ferroperm Piezoceramics A/S, with modes of resonant vibration in both the thickness and radius extension mode. The second piezoelectric element 209 is thus arranged to produce Lamb waves 211 in the plate 201 at the selected frequency. Lamb waves are produced in response to either mode of resonant vibration of the piezoelectric element 209. The Lamb waves 211 propagate through the plate 201, excite the first sensors 202 and enable power harvesting by the respective power harvester modules (P) 203. Non-dispersive Lamb waves modes, such as S0 or A0, are selected for power transmission since they are less attenuated by the structure than other Lamb waves modes or other waves at other frequencies. Lamb waves also exhibit predictable single mode propagation behavior at low ultrasonic frequencies, that is, frequencies greater than approximately 20 kHz and up to approximately 200 kHz.

In the present embodiment, the sensors 106 and the WPT device 107 all comprise respective wireless communications modules 205, 210 arranged to enable wireless communications between the WPT device 107 and the sensors 106 and also between respective WPT devices 107 or respective sensors 106.

In the present embodiment, the power management module 208 of the WPT device 107 comprises an optimisation means in the form of an optimisation module 212 arranged to control the power transmission frequency of the signal operating the second piezoelectric element 209 so as to optimise the transmission of power from the WPT device 107 to the power harvesting modules 203 of the sensors 106. The optimization module 212 is arranged to power the second piezoelectric element 209 for a selected range of power transmission test frequencies within its output frequency bandwidth and monitor the effect of each transmitted frequency on the voltage generated by the power harvester modules 203 of each of the sensors 106. The optimization module 212 is then arranged to analyze the resulting harvested voltages or voltage responses and to select an optimum power transmission frequency in accordance with a predetermined formula.

In the present embodiment, the optimized frequency selection formula is arranged to select the optimized power generation frequency as the test frequency that results in the highest collective voltage from the set of power harvesting modules 203. In other words, for each test frequency in the predetermined range the sum of the resultant voltages from the set of power harvesting modules 203 is calculated. The test frequency generating the highest sum of harvested voltages is then selected as the generation frequency. If more than one test frequency generates the highest sum then, in the present embodiment, the lowest frequency is selected as the generation frequency.

The optimiser module 212 is arranged, when generating test frequencies as described above, to collect the harvested voltage data from the sensors 106 by sending calibration requests via the communications module 210. The respective communications modules 205 of the sensors are arranged to be responsive to such calibration requests and to pass the request to the sensor logic 204. In the present embodiment, the sensor logic 204 comprises both the required SHM logic and calibration logic. The sensor logic 204 is thus arranged to determine the current harvested voltage data from the power harvesting module 203 and to provide a response comprising the voltage data to the optimizer module 211 via the respective communications modules 205, 210. The optimizer modules 211 is arranged to send such calibration requests to each sensor 106 for each test frequency.

In tests of the example of FIG. 2 the WPT device 106 optimised the power transmission frequency to within the range of 135 kHz to 145 kHz. This provided harvested voltages of 4 to 6 volts at the respective sensors 106. The harvested power ranged from 1.29 mW to 2.8 mW. The highest harvested power was obtained at 141810 Hz with a resistive load of 4.6 kΩ.

In the present embodiment, the optimisation module 212 is arranged to perform its optimisation process in response to a predetermined set of operational states or changes of operational state of the aircraft 101. The optimisation module 212 is also arranged to be manually operable to perform its optimisation process. In the present embodiment, the predetermined set of operational states or changes of operational state that automatically initiate the optimisation process are as follows:
 a) start-up of the aircraft systems;
 b) landing;
 c) refuelling;
 d) standing for a predetermined period; or
 e) reaching cruising altitude.

Figure 3:
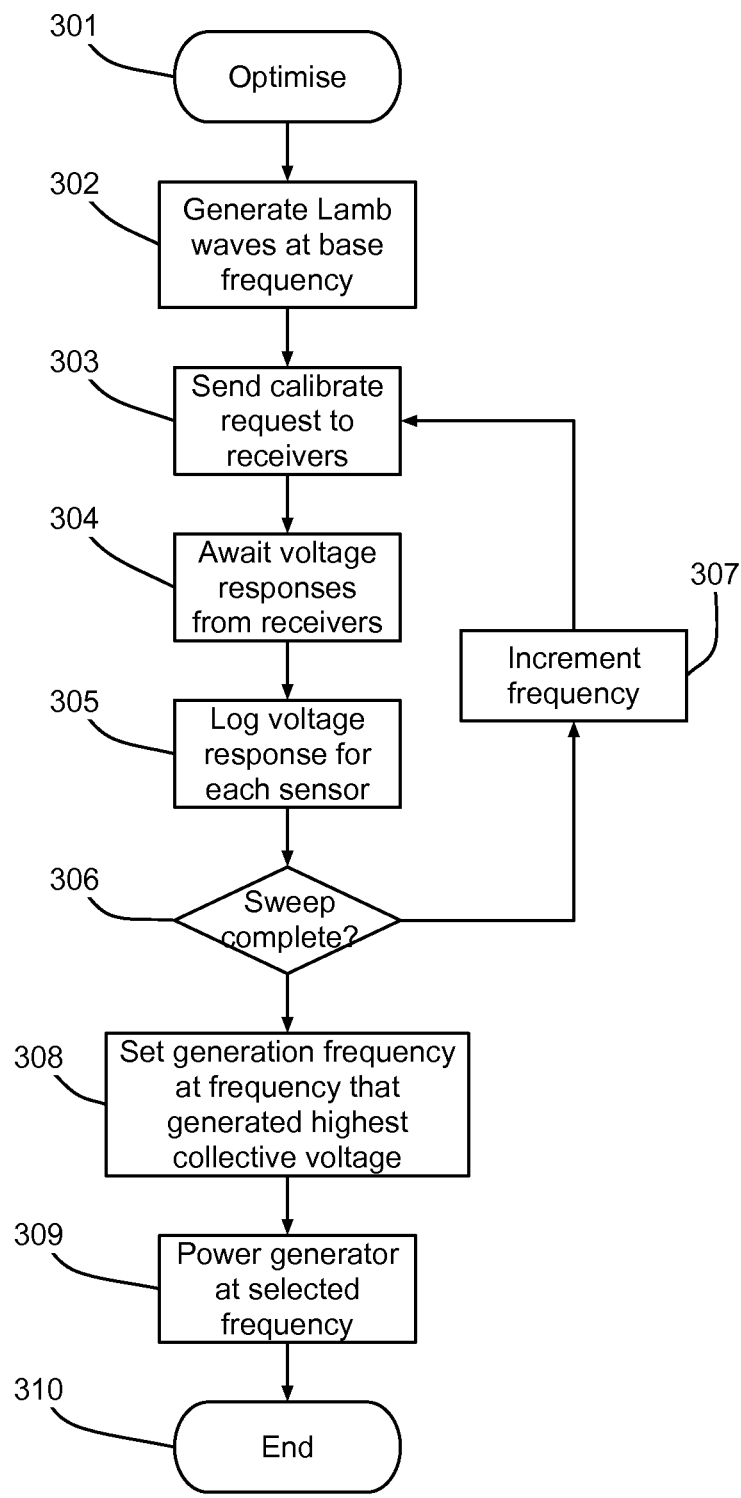
FIG. 3 is flow chart illustrating the processing performed by a power generator during calibration of the system of FIG. 2.

The processing performed by the optimisation module 212 when optimising the wireless power transmission will now be described further with reference to the flow chart of FIG. 3. Processing is initiated at step 301 in response to one of the predetermined set of operational states or changes of operational state being detected and processing moves to step 302. At step 302 the second piezoelectric element 209 is powered at the base frequency for the predetermined frequency range and processing moves to step 303. At step 303 a calibration request is sent to the surrounding set of sensors 106 and processing moves to step 304. At step 304 responses from each of the set of sensors 106 is awaited and at step 305 each voltage response is logged as it is received. Once all responses have been received processing moves to step 306. At step 306, if the sweep of test frequencies is incomplete then processing moves to step 307. At step 307 the calibration frequency powering the second piezoelectric element 209 is incremented by a predetermined amount and processing moves to step 303 and proceeds as described above. Once the calibration frequency sweep has been completed, that is, the second piezoelectric element 209 has been powered at each predetermined frequency increment and responses received for each increment from each sensor 106 then processing moves to step 308. At step 308 the generation frequency for the second piezoelectric element 209 is set at the test frequency that resulted in the highest collective voltage response from the power harvesting modules 203 of the set of sensors 106 and processing moves to step 309. At step 309 the second piezoelectric element 209 is powered at the selected generation frequency thus wirelessly transmitting power to each of the set of sensors via Lamb waves transmitted through the structure 201 of the aircraft 101. Processing then moves to step 310 and ends.

Figure 4:
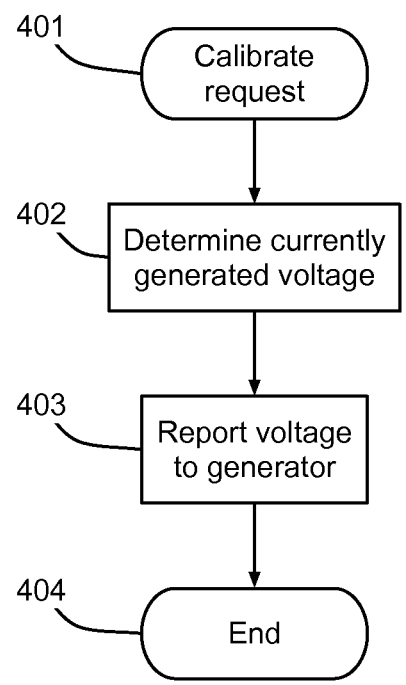
FIG. 4 is flow chart illustrating the processing performed by a sensor during calibration of the system of FIG. 2.

The processing performed by the calibration logic of each of the sensors 106 in response to the receipt by the respective communications modules 205 of a calibration request from the WPT device 107 will now be described further with reference to the flow chart is FIG. 4. At step 401 a calibration request of received by the communications module 205 and passed to the calibration logic and processing moves to step 402. At step 402 the voltage currently being generated by the power harvesting module 203 is determined and processing moves to step 403. At step 403 the determined voltage is communicated to the WPT device 107 via the communications module 205 and processing moves to step 404 and ends.

In the present embodiment, each set of sensors 106 is associated with a predetermined one of the WPT devices 107. For any given sensor 106 the WPT device 107 with which it is associated is selected based on the proximity of the two devices in terms of the transmission path of the power signal through the structure 201. Each WPT device 107 and sensor 106 set is provided with a unique identifier that distinguishes that set from other such sets. The unique identifier is used in the communications between the WPT device 107 and sensor 106 in its set so that the calibration data is communicated only between the appropriate devices. As such, the calibration of the WPT devices 107 and sensor 106 sets in the aircraft 101 as a whole are performed for each of the local zones covered by the given set of sensors 106. In other words, WPT device 107 and sensor 106 sets may be operating at different power transmission frequencies depending on local conditions.

Figure 5:
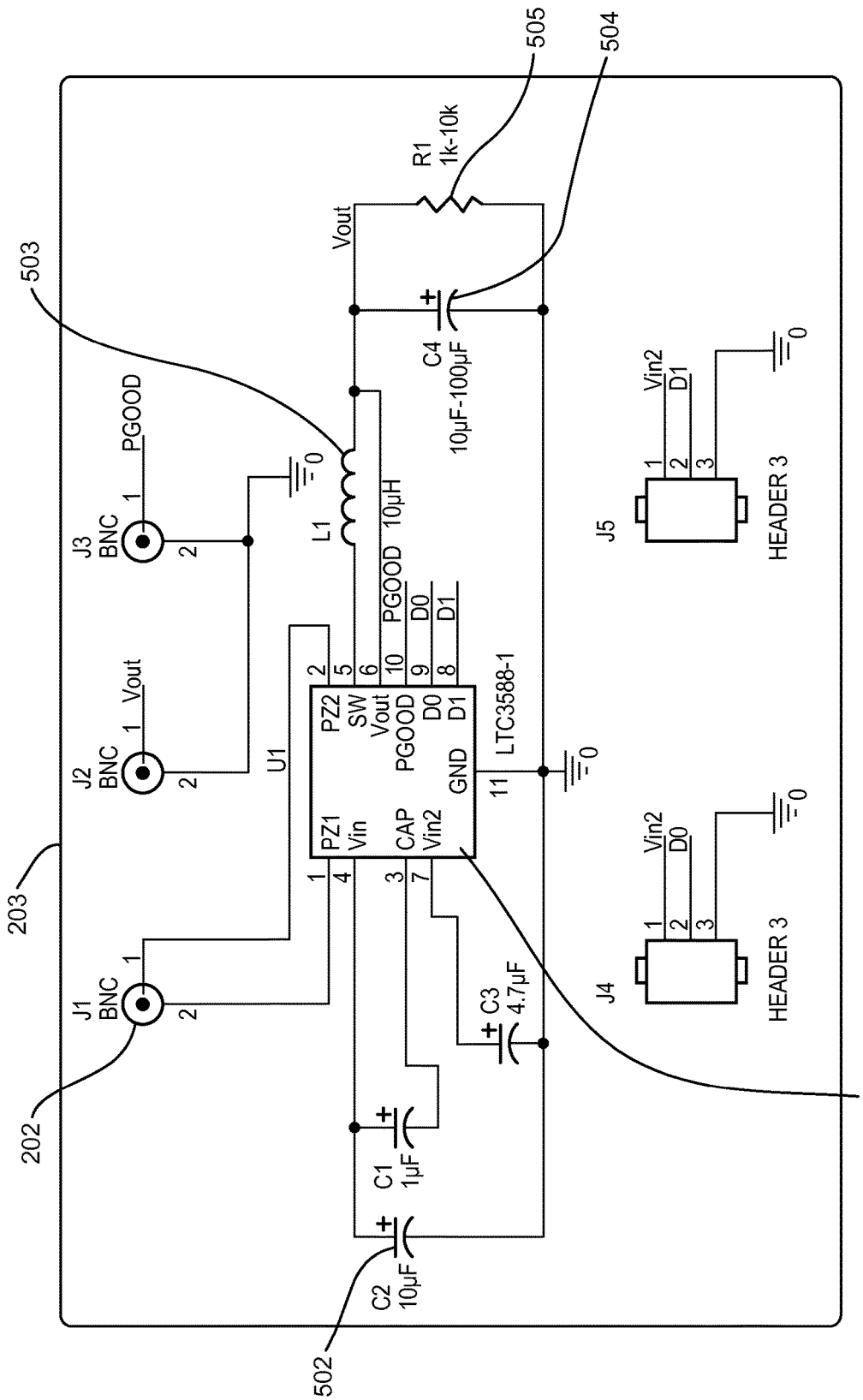
FIG. 5 is a circuit diagram of a power harvesting module associated with one of the sensors in the SHM system of FIG. 1.

As noted above, the power harvester module (P) 203 comprises a model LTC 3588-1 piezoelectric energy harvesting power supply (PEHPS) 501 in conjunction with ancillary circuitry as shown in FIG. 5. The AC voltage from the sensor 201 is received between the pins PZ1 and PZ2 of the PEHPS 501 and is rectified to a DC voltage using a bridge rectifier in the PEHPS 501. Meanwhile the harvested charge is accumulated in a capacitor 502 connected at Vin. Consequently, the voltage across the capacitor 502 gradually increases until its value reaches the Under-voltage Lockout (UVLO) rising threshold when a buck converter in the PEHPS 501 is enabled. Then, a PMOS switch in the PEHPS 501 is closed and the charge is transferred to an inductor 503 connected at pin SW as magnetic energy. When the PMOS switch is opened and an NMOS switch in the PEHPS 501 is closed, the charge is finally transferred to a capacitor 504 at the pin Vout. The pin PGOOD is a signal pin used to indicate that the output voltage, that is Vout is in regulation. The pins D0 and Sainthuile are bits provided for output voltage selection. Pin Vin2 is used as the logic high of these bits and the GND pin is the logic low. The circuit provides for the selection of four output voltages: 1.8V, 2.5V, 3.3V, 3.6V corresponding to the selection of the bits values 00, 01, 10, 11 via pin D0 513 and Sainthuile 514 respectively. An external load, in the form of a resistor 505 is provided for measuring the generated voltage.

In another embodiment, the predetermined formula for selecting the power generation frequency from the results of the calibration test comprises selecting the generation frequency producing the highest voltage from any one of said power harvesting devices. The formula may further comprise a lower threshold voltage, which all sensors must exceed for a given frequency to be selected as the generation frequency. In other words, if for any test frequency, one or more power harvesting devices fails to generate a voltage at or above the threshold, for example 4 volts, then that test frequency is invalid as a generation frequency.

In a further embodiment, the predetermined formula comprises selecting the generation frequency as the test frequency producing the greatest proportion of voltages from all power harvesting device exceeding a predetermined upper threshold. The formula may further comprise a lower threshold voltage, which all sensors must exceed for a given frequency to be selected as the generation frequency.

In another embodiment, when a generation frequency has been initially selected, the process is repeated at a higher test frequency resolution for a predetermined frequency band comprising said first selected generation frequency so as to improve the accuracy of the selected generation frequency.

In a further embodiment, the power harvesting devices are arranged to harvest power from the WPT device and from ambient vibration in the structure, for example, resulting from engine vibration or aerodynamic loading. The power harvesting devices may be arranged to use ambient power harvesting to top up power from the WPT device, for example, during periods of high power demand from the associated sensor or periods of low generation from the WPT device or outage of the WPT device.

In another embodiment, the sensor is provided with a first piezoelectric element for sensing functions and a second piezoelectric element for power harvesting respectively.

In a further embodiment, a waveform other than Lamb waves is selected for transmitting power from the generator to the power harvesting devices.

In another embodiment, the optimisation process is automatically initiated at predetermined intervals. Such periodic initiation may only be enabled once one of the predetermined set of operational states or changes of operational state is detected.

In a further embodiment, the range of the test frequencies is in the approximate range of 1 kHz to 2 MHz.

As will be understood by those skilled in the art, any suitable communications protocol may be used for communications between a given WPT device and its corresponding set of sensors.

As will be understood by those skilled in the art, the frequency of the selected non-dispersive Lamb waves that provide the optimum power transmission will be governed by the physical attributes of the structure such as its stiffness and thickness. Where the structure is formed from a synthetic composite material, such as carbon fibre reinforced plastic, the orientation of the plies of the material will also have an effect on the optimum transmission frequencies.

As will be understood by those skilled in the art, the sensor may be arranged to perform any suitable function depending on its application such as sensing or data logging and need not make use of a piezoelectric element. In other words, the sensor may be any suitable device, depending on a given application, that uses a remote power source in the form of the power harvesting device described herein.

As will be understood by those skilled in the art, any mechanism may be employed to provide communications between the WPT device and the sensors.

In the present description, the term wireless power transmission (WPT) is used to describe the method of transmitting power from a generator to a power harvesting device via waves, such as Lamb waves, generated in a structure. WPT may also be referred to as active power harvesting, that is, power harvesting in which a specific active power source is provided to provide energy for the power harvesting devices. Such active power harvesting systems may be contrasted to systems that harvest energy from ambient energy sources and may be referred to as passive power harvesting systems.

As will be understood by those skilled in the art, the structure may be any suitable structure such as any vehicle or civil engineering structure and the optimisation routine may be performed in response to any predetermined set of changes of state or condition associated with the structure. The selected changes of state are those most likely to result in a change in the Lamb wave conduction properties of the structure.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for wireless power transmission between a plurality of piezoelectric power harvesting devices attached to a structure and a wireless transmission device comprising a piezoelectric generator attached to said structure, said piezoelectric generator being arranged to generate vibrations in said structure, said method comprising the steps of:

controlling the piezoelectric generator to generate vibrations in said structure at a first test generation frequency to power the plurality of piezoelectric harvesting devices;

receiving, at the wireless power transmission device, a first plurality of response messages from the plurality of piezoelectric power harvesting devices, each response messages in the first plurality of response messages being indicative of a harvested voltage generated by a respective piezoelectric harvesting device in the plurality of piezoelectric power harvesting devices in response to the vibrations in said structure at the first test generation frequency generated by said piezoelectric generator;

controlling the piezoelectric generator to generate vibrations in said structure at a second test generation frequency to power the plurality of piezoelectric harvesting devices, the second test generation frequency being different to the first test generation frequency;

receiving, at the wireless power transmission device, a second plurality of response messages from the plurality of piezoelectric power harvesting devices, each response message in the second plurality of response messages being indicative of a harvested voltage generated by a respective piezoelectric harvesting device in the plurality of piezoelectric power harvesting devices in response to the vibrations in said structure at the second test generation frequency generated by said piezoelectric generator;

selecting a generation frequency from one of said first test generation frequency and said second test generation frequency based on said first plurality of response messages and said second plurality of response messages, and in accordance with a predetermined formula applied to the first plurality of response messages and the second plurality of response messages; and controlling said piezoelectric generator to generate vibrations in said structure at said generation frequency.

2. The method according to claim 1 in which said vibrations are Lamb waves.

3. The method according to claim 1 in which said vibrations comprise one or more non-dispersive Lamb wave modes.

4. The method according to claim 1 in which said predetermined formula comprises selecting said generation frequency as the first test generation frequency or the second test generation frequency corresponding to a highest harvested voltage produced by any one of said piezoelectric power harvesting devices.

5. The method according to claim 1 in which said predetermined formula comprises selecting said generation frequency as the first test generation frequency or the second test generation frequency depending on whether the first plurality of response messages or the second plurality of response messages indicate a greater proportion of harvested voltages which exceed a predetermined threshold from all of said plurality of piezoelectric power harvesting devices.

6. The method according to claim 1 performed in response to a predetermined set of changes of state associated with said structure.

7. The method according to claim 6 in which said structure is an aircraft and said set of changes of state comprises one or more operational states of said aircraft.

8. The method of claim 7 wherein the one or more operational states of said aircraft include one or more of: start-up of aircraft systems, landing of the aircraft, refueling of the aircraft, standing by the aircraft for at least a predetermined period and the aircraft reach a cruising altitude.

9. The method of claim 8 wherein the steps of receiving first and second response messages and selection of the generation frequency are performed in response to two or more of the landing, the refueling, the standing and the reaching of the cruising altitude.

10. The method according to claim 1 in which said piezoelectric power harvesting devices are arranged to harvest power from the generation frequency applied to the structure and from ambient vibration in said structure.

11. The method according to claim 1 in which said piezoelectric power harvesting devices each comprise a wireless communications device configured to communicate the response messages.

12. The method according to claim 1 in which the first plurality of response messages and the second plurality of response messages are transmitted in response to a request to each of said power harvesting device from said wireless power transmission device.

13. The method according to claim 1 in which said piezoelectric power harvesting devices each are arranged to power a respective sensor.

14. The method according to claim 13 in which each of said piezoelectric power harvesting devices and the respective sensors use the same piezoelectric element for sensing and power harvesting respectively.

15. The method according to claim 1 in which the in which the first test generation frequency and the second test generation frequency are selected from a range of test frequencies from 1 kHz to 2 MHz.

16. A method for wireless power transmission between a plurality of piezoelectric power harvesting devices attached to a structure and a wireless transmission device comprising a piezoelectric generator attached to said structure, said piezoelectric generator being arranged to generate vibrations in said structure, said method comprising:
receiving, at the wireless power transmission device, a first plurality of response messages from the plurality of piezoelectric power harvesting devices, each response messages in the first plurality of response messages being indicative of a harvested voltage generated by a respective piezoelectric harvesting device in the plurality of piezoelectric power harvesting devices in response to a first test generation frequency generated by said piezoelectric generator;
receiving, at the wireless power transmission device, a second plurality of response messages from the plurality of piezoelectric power harvesting devices, each response message in the second plurality of response messages being indicative of a harvested voltage generated by a piezoelectric power harvesting device in the plurality of piezoelectric power harvesting devices in response to a second test generation frequency, different from the first test generation frequency, generated by said piezoelectric generator;
selecting a generation frequency from one of said first test generation frequency and said second test generation frequency based on said first plurality of response messages and said second plurality of response messages, and in accordance with predetermined formula applied to the first plurality of response messages and the second plurality of response messages, wherein said predetermined formula comprises selecting said generation frequency as the first test generation frequency or the second test generation frequency corresponding to a higher cumulative voltage from all of said plurality of piezoelectric power harvesting devices, and
driving said piezoelectric generator to generate vibrations in said structure at said generation frequency.

17. A method for wireless power transmission between a plurality of piezoelectric power harvesting devices attached to a structure and a wireless transmission device comprising a piezoelectric generator attached to said structure, said piezoelectric generator being arranged to generate vibrations in said structure, said method comprising:
receiving, at the wireless power transmission device, first plurality of response messages from the plurality of piezoelectric power harvesting devices, each response messages in the first plurality response messages indicative of a harvested voltage generated by a respective one of the plurality of piezoelectric power harvesting devices in response to a first test generation frequency generated by said piezoelectric generator;
receiving, at the wireless power transmission device, second plurality of response messages from the plurality of piezoelectric power harvesting devices, each response messages in the second plurality of response messages being indicative of a harvested voltage generated by a respective one of the plurality of piezoelectric power harvesting devices in response to a second test generation frequency, different from the first test generation frequency, generated by said piezoelectric generator;
selecting a generation frequency from one of said first test generation frequency and said second test generation frequency by applying a predetermined formula to the first plurality of response messages and the second plurality of response messages; and
driving said piezoelectric generator to generate vibrations in said structure at said generation frequency,
wherein said determining of the harvested voltages and said selecting of said generation frequency is repeated at a higher test frequency resolution for a predetermined frequency band comprising said selected generation frequency.

18. An apparatus for wireless power transmission to a plurality of piezoelectric power harvesting devices attached to a structure, the apparatus comprising a piezoelectric generator attachable to said structure, said generator being arranged to generate vibrations in said structure, said apparatus being operable to:
  control the piezoelectric generator to generate vibrations in said structure at a first test generation frequency to power the plurality of piezoelectric harvesting devices;
  receive a first plurality of response messages from the plurality of piezoelectric power harvesting devices, each response messages in the first plurality of response messages being indicative of a harvested voltage transmitted a respective one the plurality of piezoelectric power harvesting devices, in response to the vibrations in said structure at the first test generation frequency applied by said generator to the structure;
  control the piezoelectric generator to generate vibrations in said structure at a second test generation frequency to power the plurality of piezoelectric harvesting devices, the second test generation frequency being different to the first test generation frequency;
  receive a second plurality of response messages from the plurality of piezoelectric power harvesting devices, each response messages in the second plurality of response message being indicative of a harvested voltage transmitted by a respective one of the plurality of piezoelectric power harvesting devices, in response to the vibrations in said structure at the second test generation frequency generated by said piezoelectric generator;
  select a generation frequency from one of said first test generation frequency and said second test generation frequency based on said first plurality of response messages and the second plurality of response messages in accordance with a predetermined formula; and
  control said generator to generate vibrations in said structure at said generation frequency.

19. The apparatus according to claim 18 in which said vibrations are Lamb waves.

20. The apparatus according to claim 18 in which said vibrations comprise one or more non-dispersive Lamb wave modes.

21. The apparatus according to claim 18 in which said predetermined formula comprises selecting said generation frequency as whichever of the first test generation frequency and said second test generation frequency produces the highest voltage from any one of said piezoelectric power harvesting devices.

22. The apparatus according to claim 18 in which said predetermined formula comprises selecting said generation frequency as whichever of the test generation frequency and the second test generation frequency produces the greatest proportion of voltages from all of said piezoelectric power harvesting devices which exceeds a predetermined threshold.

23. The apparatus according to claim 18 performed in response to a predetermined set of changes of state associated with said structure.

24. The apparatus according to claim 23 in which said structure is an aircraft and said set of changes of state comprises one or more operational states of said aircraft.

25. The apparatus according to claim 18 in which said power harvesting devices are arranged to harvest power from the selected generation frequency and from ambient vibration in said structure.

26. The apparatus according to claim 18 in which said piezoelectric power harvesting devices each comprise a wireless communications device.

27. The apparatus according to claim 18 in which first plurality of response messages and second plurality of response messages are sent in response to a request to each of said power harvesting devices from said apparatus.

28. The apparatus according to claim 18 in which said plurality of respective piezoelectric power harvesting devices are each arranged to power a respective sensor.

29. The apparatus according to claim 28 in which each of said plurality of piezoelectric power harvesting devices comprises a piezoelectric element, wherein said plurality of respective sensors and said plurality of piezoelectric power harvesting devices use the same respective piezoelectric element for sensing and power harvesting respectively.

30. The apparatus according to claim 18 in which the first test generation frequency and the second test generation frequency are selected from a range of test frequencies from 1 kHz to 2 MHz.

31. An apparatus for wireless power transmission to a plurality of piezoelectric power harvesting devices attached to a structure, the apparatus comprising a piezoelectric generator attachable to said structure, said generator being arranged to generate vibrations in said structure, said apparatus being operable to:
  receive a first plurality of response messages each indicative of a harvested voltage generated by a respective one of piezoelectric power harvesting devices, in response to a first test generation frequency applied by said generator to the structure;
  receive a second plurality of response messages each indicative of a harvested voltage generated by a respective one of the plurality of piezoelectric power harvesting devices, in response to a second test generation frequency, different from the first test generation frequency, apply by the generator to the structure;
  select a generation frequency from one of said first test generation frequency and said second test generation frequency based on said first plurality of response messages and said second plurality of response messages in accordance with a predetermined formula, wherein said predetermined formula comprises selecting said generation frequency as whichever of the first test generation frequency and said second test generation frequency produces the highest cumulative voltage from all of said piezoelectric power harvesting devices, and
  drive said generator to generate vibrations in said structure at said generation frequency.

32. An apparatus for wireless power transmission to a plurality of piezoelectric power harvesting devices attached to a structure, the apparatus comprising a piezoelectric generator attachable to said structure, said generator being arranged to generate vibrations in said structure, said apparatus being operable to:
  receive a first plurality of response messages from the plurality of piezoelectric power harvesting devices, each response message in the first plurality of response messages being indicative of a harvested voltage transmitted by a respective one of the plurality of piezoelectric power harvesting devices, in response to a first test generation frequency applied by said generator to the structure;
  receive a second plurality of response messages from the plurality of piezoelectric power harvesting devices, each response message in the second plurality of response messages being indicative of a harvested voltage generated by a respective one of the plurality of piezoelectric power harvesting devices, in response to a second test generation frequency, different from the first test generation frequency, apply by the generator to the structure;

select a generation frequency from one of said first test generation frequency and said second test generation frequency based on said first plurality of response messages and said second plurality of response messages, in accordance with a predetermined formula; and drive said generator to generate vibrations in said structure at said generation frequency, wherein said determining of the harvested voltage and said selecting said generation frequency is repeated at a higher test frequency resolution for a predetermined frequency band comprising said selected generation frequency.

33. A computer program stored on a non-transitory computer readable medium and loadable into the internal memory of a computer, comprising software code portions arranged, when said program is executed by a computer, cause the computer to perform a method of wireless power transmission comprising:

controlling a piezoelectric generator to generate vibrations in a structure at a first test generation frequency to power a plurality of piezoelectric harvesting devices attached to said structure;

receiving, at the wireless power transmission device, a first plurality of response messages from the plurality of piezoelectric power harvesting devices, each response message in the first plurality of response messages being indicative of a harvested voltage generated by a respective one of the plurality of piezoelectric power harvesting devices in response to the vibrations in said structure at the first test generation vibration frequency applied by the piezoelectric generator to the structure;

controlling the piezoelectric generator to generate vibrations in said structure at a second test generation frequency to power the plurality of piezoelectric harvesting devices, the second test generation frequency being different to the first test generation frequency;

receiving, at the wireless power transmission device, a second plurality of response messages from the plurality of piezoelectric power harvesting devices, each response message in the second plurality of response messages being indicative of a harvested voltage generated by a respective one of the plurality of piezoelectric power harvesting devices in response to the vibrations in said structure at the second test generation frequency applied by the piezoelectric generator to the structure;

selecting a generation frequency from one of the first test generation frequency and the second test generation frequency based on a predetermined formula applied to the first plurality of response messages and the second plurality of response messages; and subsequent to the selection of the generation frequency, controlling the piezoelectric generator to generate vibrations in said structure in said structure at said generation frequency.

34. A method for wireless power transmission between piezoelectric power harvesting devices attached to a structure and a wireless transmission device comprising a piezoelectric generator attached to said structure, the method comprising:

controlling the piezoelectric generator to generate vibrations in the structure at a first test generation frequency to power the piezoelectric harvesting devices;

receiving, at the wireless power transmission device, a first set of response messages from the piezoelectric power harvesting devices, wherein each of the response messages in the first set is indicative of a harvested voltage generated by a respective one the piezoelectric power harvesting devices in response to the vibrations in the structure at the first test generation frequency generated by the piezoelectric generator;

controlling the piezoelectric generator to generate vibrations in the structure at a second test generation frequency to power the piezoelectric harvesting devices, the second test generation frequency being different to the first test generation frequency;

receiving, at the wireless power transmission device, a second set of response messages from the piezoelectric harvesting devices, wherein each of the response messages in the second set is indicative of a harvested voltage generated by a respective one the piezoelectric power harvesting devices in response to the vibrations in the structure at the second test generation frequency generated by the piezoelectric generator;

selecting a generation frequency from one of the first test generation frequency and the second test generation frequency based on the first and second sets of response messages; and after the selection, controlling the piezoelectric generator to generate vibrations in the structure at the generation frequency to power the piezoelectric power harvesting devices.

35. The method of claim 34 wherein the pluralities of the harvested voltages on which the selection is based are aggregates of each of the pluralities of the harvested voltages.

36. The method of claim 34 wherein the pluralities of the harvested voltages on which the selection is based are sums of each of the pluralities of the harvested voltages.

* * * * *